United States Patent [19]
Cowpland et al.

[11] 4,281,219
[45] Jul. 28, 1981

[54] TELEPHONE LINE CIRCUIT

[75] Inventors: Michael C. J. Cowpland, Ottawa; Patrick R. Beirne, Stittsville, both of Canada

[73] Assignee: Mitel Corporation, Ontario, Canada

[21] Appl. No.: 62,989

[22] Filed: Aug. 2, 1979

[30] Foreign Application Priority Data

Feb. 1, 1978 [CA] Canada ................................ 296137
Jun. 23, 1979 [DE] Fed. Rep. of Germany ....... 2925444

[51] Int. Cl.³ ........................................... H04Q 3/18
[52] U.S. Cl. ........................................... 179/18 FA
[58] Field of Search ........... 179/18 F, 18 FA, 18 HA, 179/18 HB, 18 AD, 16 F, 16 A, 170 R, 170 D, 170 E, 170 NC, 170 T, 16 EC

[56] References Cited

U.S. PATENT DOCUMENTS

4,178,485  12/1979  Cowpland et al. ............. 179/18 FA

*Primary Examiner*—Thomas A. Robinson
*Attorney, Agent, or Firm*—Craig and Antonelli

[57] ABSTRACT

A telephone line circuit includes balanced tip and ring leads for connection to a telephone set and an unbalanced line output lead. A first differential amplifier has its input terminals connected through individual equal-valued resistors to the tip and ring leads, the values of each resistor being at least 10 times the off hook impedance of the telephone set. The output of the first differential amplifier is connected in a circuit path to a line output lead, for applying outgoing signals thereto. A second differential amplifier has its input connected in a circuit path to a line input lead for receiving incoming signals, and its output connected in a circuit path to one of the tip or ring leads, and connected by a further resistor to the input of the first differential amplifier which is connected to the other of the tip or ring leads. The value of the further resistor is selected to apply sufficient output signal from the second differential amplifier to the other input of the first differential amplifier so as to substantially cancel signals within the first differential amplifier appearing at its input terminals which were applied from the output of the second differential amplifier to the tip and ring leads.

7 Claims, 1 Drawing Figure

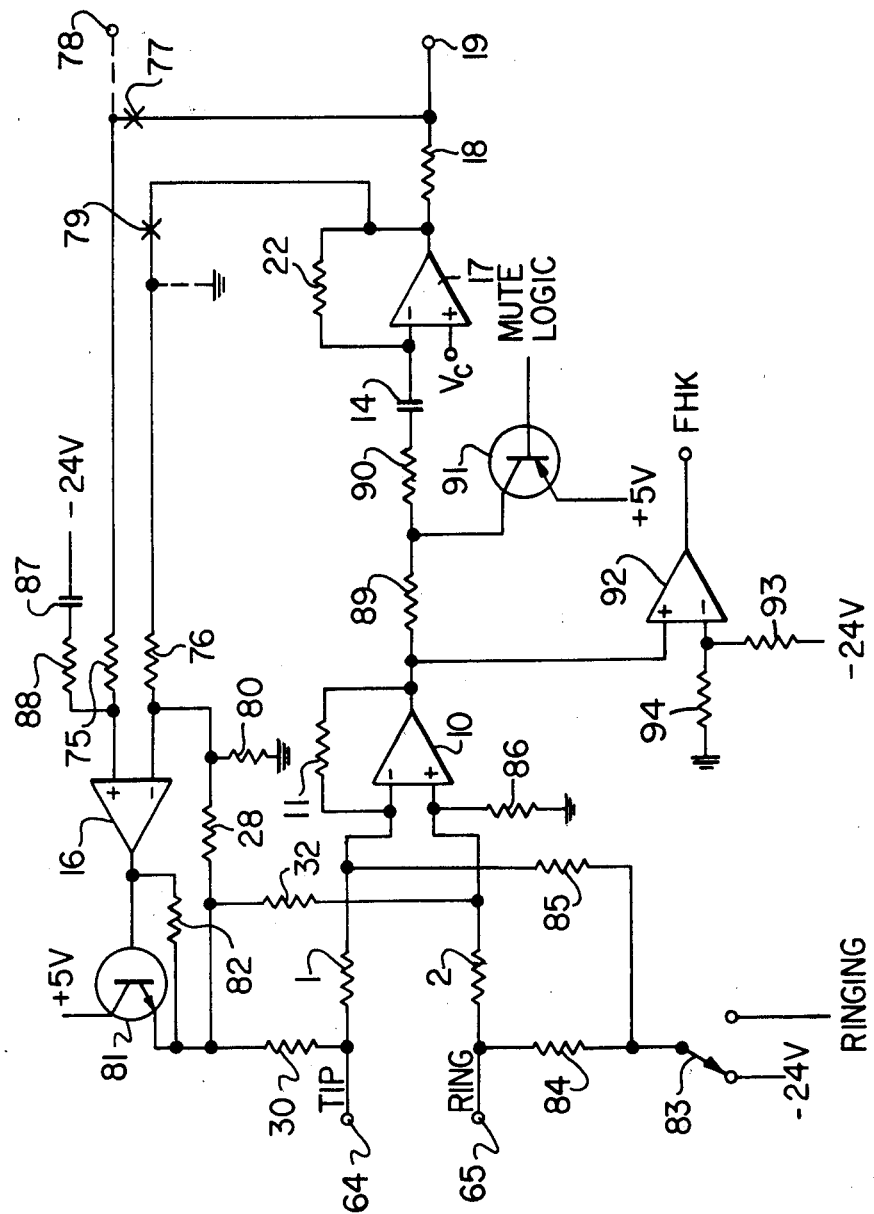

4,281,219

TELEPHONE LINE CIRCUIT

CROSS REFERENCE TO RELATED APPLICATIONS

The present application is a continuation-in-part of U.S. Patent Application Ser. No. 906,772, filed May 17, 1978 for "Telephone Line Circuit", now U.S. Pat. No. 4,178,485, issued Dec. 11, 1979.

FIELD OF THE INVENTION

The present invention relates to a transformerless bidirectional wire line circuit which is particularly suited for use in a PBX.

BACKGROUND OF THE INVENTION

As is described in our above-referenced co-pending parent application Ser. No. 906,772, now U.S. Pat. No. 4,178,485, issued Dec. 11, 1979, and assigned to the assignee of the present application, line circuits, such as those associated with an electronic PBX have particular characteristics and requirements among which are the ability to change signal levels, provide balanced line to unbalanced line conversion, etc. For a detailed discussion of such line circuits, attention may be had to our above-referenced application, which application is incorporated by reference in the present application.

As is discussed in detail in our copending parent application, we have already developed a line circuit that contains a two to one wire bidirectional amplifier arrangement which transforms a balanced tip and ring circuit to an unbalanced line and, at the same time, transforms an unbalanced line to a balanced lead pair. A detailed schematic diagram of the circuitry configuration for implementing such a line circuit is depicted in FIG. 2 of the above-referenced application.

SUMMARY OF THE INVENTION

Now, while the line circuit detailed in our above-referenced application offers a significant improvement over the prior art, we have also found that the line circuit can be connected to a tip and ring lead at one port, to an incoming signal circuit at another port, and to an outgoing signal circuit, at a third port, the second and third ports being adapted for connection to such apparatus as Codec. In the circuitry configuration depicted in FIG. 2 of the above-referenced application, the input to differential amplifier 16, rather than being connected to terminal 19, can be connected to a circuit for receiving an input signal, e.g., the output circuit of the Codec. In addition, the output of operational amplifier 17 can be connected to an input circuit, e.g., the input circuit of the Codec. The unbalanced output circuit of FIG. 2 of our parent application can thus be converted to two ports, an input port and an output port, from a single bidirectional port. The particular manner in which this conversion is implemented will be described below with reference to the single figure of the drawings.

BRIEF DESCRIPTION OF THE DRAWINGS

The single FIGURE is a detailed schematic diagram of the improved line circuit in accordance with the present invention.

DETAILED DESCRIPTION

The circuit shown in the FIGURE which represents various modifications to the circuit of FIG. 2 of our above-referenced application, depicts how the circuit can be converted to have two ports on one side, and a bidirectional port on the other.

The two inputs to differential amplifier 16 are connected via respective resistors 75 and 76, one to bidirectional unbalanced line input/output terminal 19, and the other to the output of differential amplifier 17. The inverting input of operational amplifier 16 is also connected through resistor 80 to ground.

However, for connection to a Coder-decoder (Codec) or other such four wire apparatus, the conductive path to terminal 19 is broken at point 77 and resistor 75 is connected instead to input terminal 78. The conductive path to the output of differential amplifier 17 is broken at point 79 and resistor 76 is connected instead to ground; both of the alternative connections are shown in dashed line. In this case amplifier 16 need not be of differential type.

To simplify the circuit of FIG. 2 of our above-referenced application, rather than utilizing transistors 26 and 27 in the output circuit of differential amplifier 16, a single transistor 81 is used in the circuit of the present invention. This allows connection of the collector of transistor 81 to a simplified power supply, e.g., to a +5 volt source, rather than to a split voltage power supply. The emitter is connected through resistor 30 to the tip lead, in this embodiment. Resistor 82 is connected between the base and the emitter of transistor 81.

Similar to the emitters of transistors 26 and 27 in FIG. 2 of our above-referenced application, the emitter of transistor 81 is connected through resistor 30 to the tip lead, and through resistor 32 to the noninverting input of differential amplifier 10.

The circuit of the present invention has been modified for operation with PBXs utilizing a lower voltage (e.g. −24 volts) than is normally used by a central office, which has the availability of a −48 volt supply. The present circuit is adapted to use power supplies having filtering which is somewhat poorer than might otherwise be desired, as would be economically advantageous in a low-cost PBX.

Since a low cost power supply would often contain significant amounts of A.C. ripple, the power supply leads are applied to the tip and ring leads in a manner similar to the signals received from differential amplifier 16. The −24 volt supply is connected (optionally through switch 83, which switch is also connected to a source of ringing current) to the ring lead through resistor 84 and to the inverting input of differential amplifier 10 through resistor 85. The resistance of resistor 84 should be the same as that of resistor 30, e.g., one half the line resistance (or about 300 ohms) and resistor 85 should be of similar resistance as resistor 32 (e.g. about 200,000 ohms). Resistor 86 is connected from the noninverting input of differential amplifier 10 to ground, and can be, e.g., about 10,000 ohms.

It may be seen that with the above-noted difference in resistance between resistors 84 and 85, the major portion of D.C. and A.C. ripple current from the −24 volt supply passes through resistor 84 to the ring lead. The current is applied with substantially reduced amplitude to the inverting input of differential amplifier 10. The effect of the reduced current being applied to the inverting input, and the high current being applied (with reduced amplitude due to resistor 2) to the noninverting input causes cancellation of the A.C. ripple within the differential amplifier, and no significant ripple appears at the output of differential amplifier 10 which could be passed to output terminal 19.

A.C. ripple which appears between the tip and ring terminals 64 and 65 can be cancelled by the application of the −24 volt supply through capacitor 87 in series with resistor 88 to the noninverting input of differential amplifier 16, which blocks the −24 volt D.C. but applies the A.C. ripple to the differential amplifier. The values of capacitor 87 and resistor 88 should be adjusted so that there is unity gain to the tip lead, or more precisely so that the applied A.C. ripple cancels whatever ripple appears between the tip and ring leads.

In a simplified line circuit in which no conferencing function is required, the output of differential amplifier 10 can be connected directly through capacitor 14 to the input of differential amplifier 17. However, to facilitate remote muting of the outgoing signal, a pair of resistors 89 and 90 are connected in series with the output circuit of differential amplifier 10. The junction of resistors 89 and 90 is connected to the collector of a transistor 91 which has its emitter connected to the +5 volt supply. A lead from a muting logic circuit, not part of this invention, is connected to the base of transistor 91.

Upon the muting logic circuit applying a low level signal to the base of transistor 91, the +5 volt supply is connected through the emitter-collector circuit of transistor 91 to the junction of resistors 89 and 90. This effectively shunts the output of differential amplifier 10 to the supply, cutting off the transmission of signal to the input of differential amplifier 17.

In addition, an indication of an off-hook condition on the tip and ring leads can be obtained by connecting one input of an operational amplifier 92 to the output of differential amplifier 10. The other input is connected to a voltage divider comprising resistors 93 and 94 connected between the −24 volt power supply lead and ground. With a change in the D.C. voltage across the tip and ring leads, the output voltage level of differential amplifier 10 changes, causing operational amplifier 92 to conduct once the threshold set by the voltage divider has been exceeded. The output lead FHK of operational amplifier 92 provides an output signal which is indicative of the on or off-hook condition of the tip and ring leads.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:
1. A telephone line circuit comprising:
   (a) a balanced tip and ring lead for connection to a telephone set, and an unbalanced line output lead,
   (b) first differential amplifier means having its input terminals connected through individual equal valued resistor means to the tip and ring leads, the values of each of the resistor means being at least ten times the off hook impedance of the telephone set,
   (c) the output of the first differential amplifier means being connected in a circuit path to a line output lead, for applying outgoing signals thereto,
   (d) second amplifier means having its input connected in a circuit path to a line input lead for receiving incoming signals,
   (e) the output of the second amplifier means being connected in a circuit path to one of the tip or ring leads,
   (f) the output of the second amplifier means also being connected by a further resistor means to the input of the first differential amplifier means which is connected to the other of the tip or ring leads,
   (g) the value of the further resistor means being selected to apply sufficient output signal from the second amplifier means to said other input of the first differential amplifier means so as to substantially cancel signals within the first differential amplifier means appearing at its input terminals which were applied from the output of the second amplifier means to the tip and ring leads.

2. An amplifier circuit as defined in claim 1 further including means for applying current from a D.C. power source to said other of the tip or ring leads; and to the input of the first differential amplifier means which is connected to said one of the tip or ring leads through a resistor of similar value as said further resistor means, whereby A.C. ripple which may be carried by the power source current is applied to said other of the tip or ring leads and to the input of the differential amplifier means so as to substantially cancel within the first differential amplifier means.

3. An amplifier circuit as defined in claim 1, further including means for applying current from a D.C. power source via a capacitor in series with a resistor to the input of the second differential amplifier means, whereby A.C. ripple generated by the power source is applied to said tip and ring leads so as to cancel hum of similar frequency as said ripple carried by said leads.

4. An amplifier circuit as defined in claim 1, further including means for applying current from a D.C. power source to said other of the tip or ring leads, and through a resistor of similar value as said further resistor means to the input of the first differential amplifier means which is connected to said one of the tip or ring leads, whereby any A.C. ripple current which may be carried by the power source current is applied to said one of the tip or ring leads and to the input of the differential amplifier means, so as to substantially cancel within the first differential amplifier means, and means for applying current from said D.C. power source via a capacitor in series with a resistor to the input of the second amplifier means, whereby A.C. ripple current generated by the power source is applied to said tip and ring leads so as to cancel hum of similar frequency as said ripple carried by said leads.

5. A telephone line circuit comprising:
   (a) balanced tip and ring leads for connection to a telephone set, and an unbalanced line output lead,
   (b) first differential amplifier means having its input terminals connected through individual equal valued resistor means to the tip and ring leads, the values of each of the resistor means being large relative to the offhook impedance of the telephone set,
   (c) the output of the first differential amplifier means being connected by a circuit path to said line output lead for applying outgoing signals thereto,
   (d) second amplifier means having its input connected by a circuit path to the line output lead for receiving incoming signals, (e) the output of the second amplifier means being connected to one of the tip or ring leads to which one input of the first differential amplifier is connected, (f) the output of the second amplifier means also being connected by a further resistor means to the other input of the first differential amplifier means, (g) the value of the further resistor means being selected to apply sufficient output signal from the second amplifier means to said other input of the first differential amplifier means so as to substantially cancel a signal within the first differential amplifier means which is applied to its said one input terminal via said one of the tip or ring leads from the output of the second amplifier means, and further including (h) means for applying current from a D.C. power source to said other of the tip or ring leads; and to the input of the first differential amplifier means which is connected to said one of the tip or ring leads through a resistor of similar value as said further resistor means, whereby A.C. ripple which may be carried by the power source current is applied to said other of the tip or ring leads and to the input of the differential amplifier means so as to substantially cancel within the first differential amplifier means.

6. A telephone line circuit comprising:

(a) balanced tip and ring leads for connection to a telephone set, and an unbalanced line output lead, (b) first differential amplifier means having its input terminals connected through individual equal valued resistor means to the tip and ring leads, the values of each of the resistor means being large relative to the offhook impedance of the telephone set, (c) the output of the first differential amplifier means being connected by a circuit path to said line output lead for applying outgoing signals thereto, (d) second amplifier means having its input connected by a circuit path to the line output lead for receiving incoming signals, (e) the output of the second amplifier means being connected to one of the tip or ring leads to which one input of the first differential amplifier is connected, (f) the output of the second amplifier means also being connected by a further resistor means to the other input of the first differential amplifier means, (g) the value of the further resistor means being selected to apply sufficient output signal from the second amplifier means to said other input of the first differential amplifier means so as to substantially cancel a signal within the first differential amplifier means which is applied to its said one input terminal via said one of the tip or ring leads from the output of the second amplifier means, and further including (h) means for applying current from a D.C. power source via a capacitor in series with a resistor to the input of the second differential amplifier means, whereby A.C. ripple generated by the power source is applied to said tip and ring leads so as to cancel hum of similar frequency as said ripple carried by said leads.

7. A telephone line circuit comprising:

(a) balanced tip and ring leads for connection to a telephone set, and an unbalanced line output lead, (b) first differential amplifier means having its input terminals connected through individual equal valued resistor means to the tip and ring leads, the values of each of the resistor means being large relative to the offhook impedance of the telephone set, (c) the output of the first differential amplifier means being connected by a circuit path to said line output lead for applying outgoing signals thereto, (d) second amplifier means having its input connected by a circuit path to the line output lead for receiving incoming signals, (e) the output of the second amplifier means being connected to one of the tip or ring leads to which one input of the first differential amplifier is connected, (f) the output of the second amplifier means also being connected by a further resistor means to the other input of the first differential amplifier means, (g) the value of the further resistor means being selected to apply sufficient output signal from the second amplifier means to said other input of the first differential amplifier means so as to substantially cancel a signal within the first differential amplifier means which is applied to its said one input terminal via said one of the tip or ring leads from the output of the second amplifier means, and further including (h) means for applying current from a D.C. power source to said other of the tip or ring leads, and through a resistor of similar value as said further resistor means to the input of the first differential amplifier means which is connected to said one of the tip or ring leads, whereby any A.C. ripple current which may be carried by the power source current is applied to said one of the tip or ring leads and to the input of the differential amplifier means, so as to substantially cancel within the first differential amplifier means, and means for applying current from said D.C. power source via a capacitor in series with a resistor to the input of the second differential amplifier means, whereby A.C. ripple current generated by the power source is applied to said tip and ring leads so as to cancel hum of similar frequency as said ripple carried by said leads.

* * * * *